US008428589B2

(12) United States Patent
Hjelmgren et al.

(10) Patent No.: US 8,428,589 B2
(45) Date of Patent: Apr. 23, 2013

(54) METHOD FOR REDUCING SIGNALLING

(75) Inventors: Klas Hjelmgren, Vastra Frolunda (SE); Par Johansson, Vastra Frolunda (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/169,315

(22) Filed: Jun. 27, 2011

(65) Prior Publication Data

US 2012/0329458 A1 Dec. 27, 2012

(30) Foreign Application Priority Data

Jun. 22, 2011 (WO) ................ PCT/EP2011/060463

(51) Int. Cl.
*H04W 4/00* (2009.01)
(52) U.S. Cl.
USPC ........ 455/435.1; 455/436; 455/418; 370/328; 370/329
(58) Field of Classification Search .................. 370/230, 370/235, 328–329; 455/418, 422.1, 445, 455/456.1, 552, 436
See application file for complete search history.

(56) References Cited

U.S. PATENT DOCUMENTS

| 2003/0156537 | A1* | 8/2003 | Soulhi et al. .................. 370/230 |
| 2004/0248577 | A1* | 12/2004 | Sayeedi ........................ 455/445 |
| 2005/0192046 | A1* | 9/2005 | Harris ........................ 455/552.1 |
| 2008/0102831 | A1* | 5/2008 | Ore ............................ 455/435.1 |
| 2008/0186912 | A1 | 8/2008 | Huomo |
| 2010/0144363 | A1* | 6/2010 | De Rosa et al. ............. 455/452.1 |
| 2010/0265908 | A1* | 10/2010 | Xue et al. ..................... 370/329 |
| 2011/0080870 | A1* | 4/2011 | Bhalla et al. ................. 370/328 |
| 2011/0105153 | A1* | 5/2011 | Miklos et al. ............... 455/456.5 |
| 2012/0002545 | A1* | 1/2012 | Watfa et al. ................... 370/235 |
| 2012/0115454 | A1* | 5/2012 | Liao ............................. 455/418 |

FOREIGN PATENT DOCUMENTS

EP 1971088 A1 9/2008

OTHER PUBLICATIONS

PCT/EP2011/060463, International Search Report, issued Mar. 8, 2012, 5 pages.
3GPP TS 23.401 V10.3,0,Technical Specification, "3$^{rd}$ Generation Partnership Project; Technical Specification Group Services and System Aspects; General Packet Radio Service (GPRS) enhancements for Evolved Universal Terrestrial Radio Access Network" (E-UTRAN) access (Release 10), 278 pages.

* cited by examiner

*Primary Examiner* — Jinsong Hu
*Assistant Examiner* — Nathan Taylor
(74) *Attorney, Agent, or Firm* — Rothwell, Figg, Ernst & Manbeck, P.C.

(57) ABSTRACT

The present invention relates to a method for UE context setup in an eNodeB for a UE subscriber in an infrastructure network. The network comprises at least one eNodeB providing radio access for the UE and an MME connected to the eNodeB. The eNodeB/-s comprises an inactivity timer releasing the UE context being setup in the eNodeB after a defined time period. The network for each UE context setup performs the steps of: the UE sending a setup request to the eNodeB, wherein the eNodeB in response to said request sends an initial UE message to the MME to initiate the UE context setup, the UE message identifying the UE sending the setup request; the MME in response to said UE message sending an initial UE context setup request to the eNodeB, wherein the eNodeB responds to the MME with an initial context response complete to finalize the UE context setup; and the MME in the setup request sending timer setup information for said UE, on which basis the eNodeB configures the time period of the inactivity timer for the UE context being setup. The present invention also relates to a MME and an eNodeB adapted for the same purpose.

13 Claims, 4 Drawing Sheets

METHOD FOR REDUCING SIGNALLING

TECHNICAL FIELD

The present invention relates to a method for UE context setup in an eNodeB for an User Equipment, UE, subscriber in an infrastructure network. The network comprises at least one eNodeB providing radio access for the UE and a Mobility Management Entity, MME, connected to the eNodeB. The eNodeB comprises an inactivity timer releasing the UE context being setup in the eNodeB after a defined time period. It also relates to an eNodeB and a MME adapted for the same purpose.

BACKGROUND

Many operators are concerned about the amount of signalling coming from all smartphones and mobile users. When a user wants to send data, or is paged because of downlink data, he must go to ECM Connected (EPS Connection Management). This is done by sending a NAS Service request.

When the user is in ECM Connected, the users mobile/user equipment, UE, is known in eNodeB in Radio Access Network, RAN, after UE context setup. The eNodeB comprises an inactivity timer which times down until the UE is put into idle mode. In ECM Connected state, handovers are performed.

There could be high signalling load in Mobility Management Entity, MME, and Serving Gateway in Core Network, CN, when there are many UE context setup requests, pagings and S1 releases, when there are handovers. With a long inactivity timer there will be many handovers (and also battery drain) and with a fast release of the radio resources there will be many service requests, pagings and S1 releases.

In order to reduce the number of service requests, pagings and D1 releases, a longer timer could be used. A possible drawback is the drain of the battery capacity. It is possible to use DRX in ECM Connected mode in order to save battery. In order to handle UE's and use a shorter inactivity timer for those, it is possible to build a mobility history in the eNodeB of the visited cells since previous Service requests/Context setup.

However, a remaining drawback is that users that are moving will result in many handovers. So, for moving UE's a shorter time may be beneficial. Another drawback with the mobility handling in eNodeB is that the radio access information is lost at each S1-UE context release, where the subscriber goes to ECM idle mode.

SUMMARY

The object of the present invention is therefore to reduce the service signalling related to radio bearer context setups caused by UE behaviour.

The object of the present invention is solved by means of a method for UE context setup in an eNodeB for an User Equipment, UE, subscriber in an infrastructure network. The network comprises at least one eNodeB providing radio access for the UE and a Mobility Management Entity, MME, connected to the eNodeB. The eNodeB comprises an inactivity timer releasing the UE context being setup in the eNodeB after a defined time period. The network for each radio bearer context setup performs the steps of:
  the UE sending a setup request to the eNodeB, wherein the eNodeB in response to said request sends an initial UE message to the MME to initiate the UE context setup, the UE message identifying the UE sending the setup request,
  the MME in response to said UE message sending an initial UE context setup request to the eNodeB, wherein the eNodeB responds to the MME with an initial context response complete to finalize the UE context setup,
  the MME in the setup request sending timer setup information for said UE, on which basis the eNodeB configures the time period of the inactivity timer for the UE context being setup.

The object of the present invention is also solved by means of a Mobility Management Entity adapted for UE context setup in an eNodeB for an User Equipment, UE, subscriber in an infrastructure network. The network comprises at least one eNodeB providing radio access for the UE and the MME connected to the eNodeB. The MME for each radio bearer context setup being adapted to perform the steps of:
  receiving an initial UE message from the eNodeB, the message being sent to initiate the UE context setup, the UE message identifying the UE sending a setup request,
  the MME in response to said UE message sending an initial UE context setup request to the eNodeB,
  the MME in the setup request sending timer setup information for said UE.

The object of the present invention is also solved by means of an eNodeB adapted for UE context setup in the eNodeB for an User Equipment, UE, subscriber in an infrastructure network. The network comprises at least one eNodeB providing radio access for the UE and a Mobility Management Entity, MME, according to any of the claims 10-13. The MME is connected to the eNodeB, the eNodeB comprising an inactivity timer releasing the UE context being setup in the eNodeB after a defined time period. The eNodeB for each radio bearer context setup being adapted to perform the steps of:
  the eNodeB receiving the setup request from the User Equipment, UE, wherein the eNodeB in response to said request sends an initial UE message to the MME to initiate the UE context setup, the UE message identifying the UE sending the setup request,
  the eNodeB receiving the initial UE context setup request from the MME, sent in response to said UE message, wherein the eNodeB responds to the MME with the initial context response complete to finalize the UE context setup,
  the eNodeB on the basis of the timer setup information for said UE configures the time period of the inactivity timer for the UE context being setup.

The present invention provides a mechanism and means which significantly increases the capacity in the Core Network, in particularly in the SGSN-MME, as a result of the reduced service signalling. There is also a signalling reduction in the Radio network due to less handovers or less UE context setups and releases. Dynamic UE behaviour analysis superior to any statically configured solution. The signalling is optimized also for specific types of devices, such a Machine to Machine (M2M) devices, which minimizes the impact on both Radio and Core. This also allows for a higher SAU figure.

BRIEF DESCRIPTION OF THE DRAWINGS

The invention will be described in greater detail in the following, with reference to the embodiments that are shown in the attached drawings, in which.

DETAILED DESCRIPTION

The embodiments of the invention with further developments described in the following are to be regarded only as examples and are in no way to limit the scope of the protection provided by the patent claims.

Figure 1:
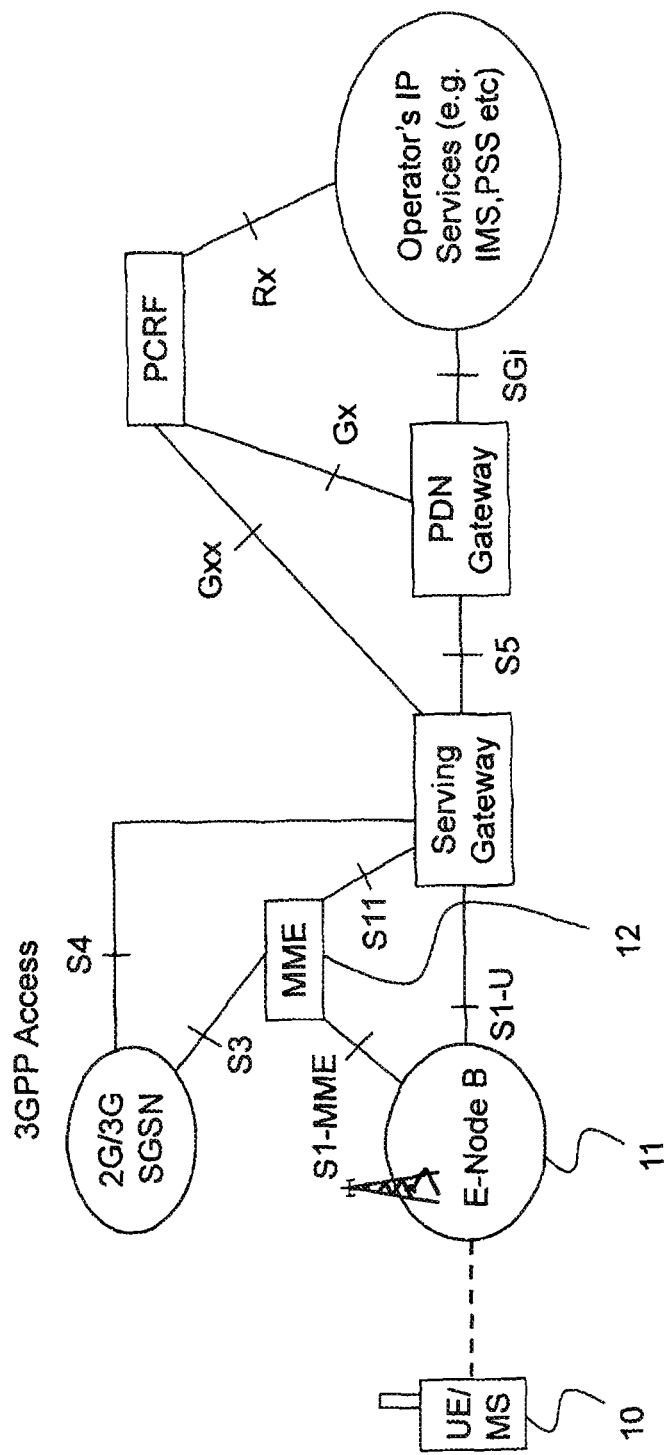
FIG. 1 illustrates the 3GPP architecture.

The present invention, see FIG. 1, relates to a method for UE context setup in an eNodeB 11 for an User Equipment 10, UE, subscriber in an infrastructure network. The network comprises at least one eNodeB 11 providing radio access for the UE and a Mobility Management Entity 12, MME, connected to the eNodeB 11. The eNodeB 11 comprises an inactivity timer releasing the UE context being setup in the eNodeB after a defined time period. FIG. 1 shows other entities in 3GPP, which are not part of the present invention and will therefore not be described any further.

Even though the detailed description describes the method performed by this entities/network, the person skilled in the art realizes that this entities/network adapted to perform these method steps is also disclosed in the description.

In order to reduce the number of service requests, pagings and D1 releases, for context setups, a longer timer could be used. A possible drawback is the drain of the battery capacity. It is possible to use DRX in ECM Connected mode in order to save battery. In order to handle UE's and use a shorter inactivity timer for those, it is possible to build a mobility history in the eNodeB of the visited cells since previous Service requests/Context setup.

However, a remaining drawback is that users that are moving will result in many handovers. So, for moving users a shorter time may be beneficial. Another drawback with the mobility handling in eNodeB is that the UE context information is lost at each S1 release, where the subscriber goes to ECM idle mode. The object of the present invention is therefore to reduce the service signalling related to UE context setups caused by UE behaviour.

Figure 4:
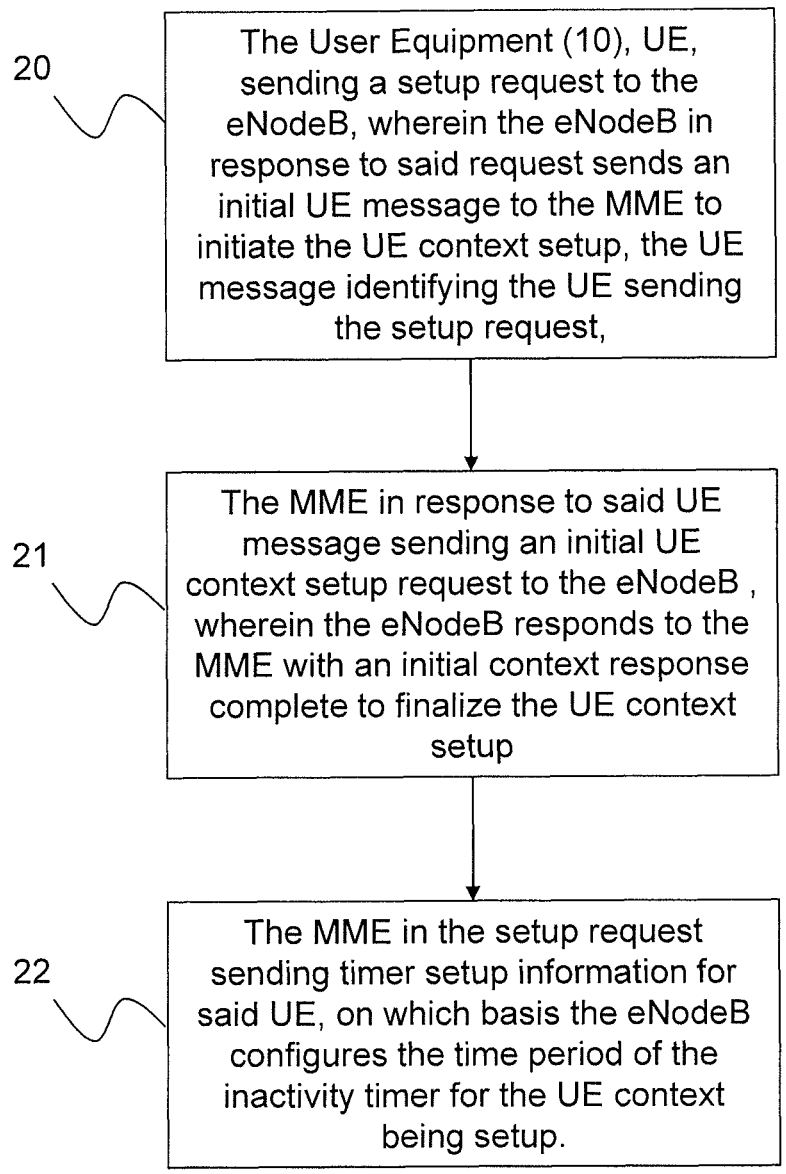
FIG. 4 illustrates a flow chart for the method according to the present invention.

This is solved by means of the following steps, see FIGS. 1 and 4:

The UE 10 sends (20) a setup request to the eNodeB 11, wherein the eNodeB in response to said request sends an initial UE message to the MME 12 to initiate the UE context setup. The UE message identifies the UE sending the setup request.

The MME 12 in response to said UE message sends 21 an initial UE context setup request to the eNodeB 11, wherein the eNodeB 11 responds to the MME 12 with an initial context response complete to finalize the radio UE setup.

The MME 12 in the setup request sends 22 timer setup information for said UE, on which basis the eNodeB 11 configures the time period of the inactivity timer for the UE context being setup.

With this solution, the MME 12 assists the LTE Radio Access Network, the eNodeB 11, to decide which UE's 10 that should have a long time period on the inactivity timer and which UE's that should have a short time period. This solution significantly increases the capacity in the Core Network, in particularly in the SGSN-MME, as a result of the reduced service signalling. There is also a signalling reduction in the Radio network due to less handovers or less UE context setups and releases.

The timer setup information preferably comprises a value indicating the time period to be set by the eNodeB 11. The timer setup information may be defined by the MME 12 on the basis of the behaviour of the UE subscribed before the present UE context setup. The behaviour may relate to information about the number of handovers or other mobility events, such as tracking area update (TAU) for the UE subscriber during a certain time period or information about the number of service requests and/or pagings for the UE subscribed during a certain time period. An alternative is that the MME 12 uses other information, such as IMEISV (International Mobile Equipment Identity Software Version) or IMSI (International Mobile Subscriber Identity) when setting an optimal value for the timer setup information. Such information indirectly indicates the behaviour, due to the characteristics (stationary, smart phone etc) of the phone.

For providing the timer setup information, which corresponds to the "User profile value", the profile of the MME 12 is for instance the following:

It comprise counters which defines the timer setup information on individual subscriber basis, for instance per signalling event type (such as service request and handover—per user). The individual subscribers, the UE's 10, are identified using the unique IMSI number for the respective UE.

Node property "User profile timer", which means a configurable node property defining a time interval used for the measurement of the user profile.

"User profile register" information is needed for average signalling events per hour, which shows the user profile. Every time a new signalling event occurs this triggers a recalculation of the "User Profile Value" by use of a sliding window with the size of the "User profile timer"

The "User profile value" is inserted into the service setup request response message (the Initial Context Setup request from the MME 12 to the eNodeB 11) in the extension field.

The MME 12 may define the timer setup information ("User Profile Value") during a number of UE context setups or only during one earlier setup.

Figure 2:
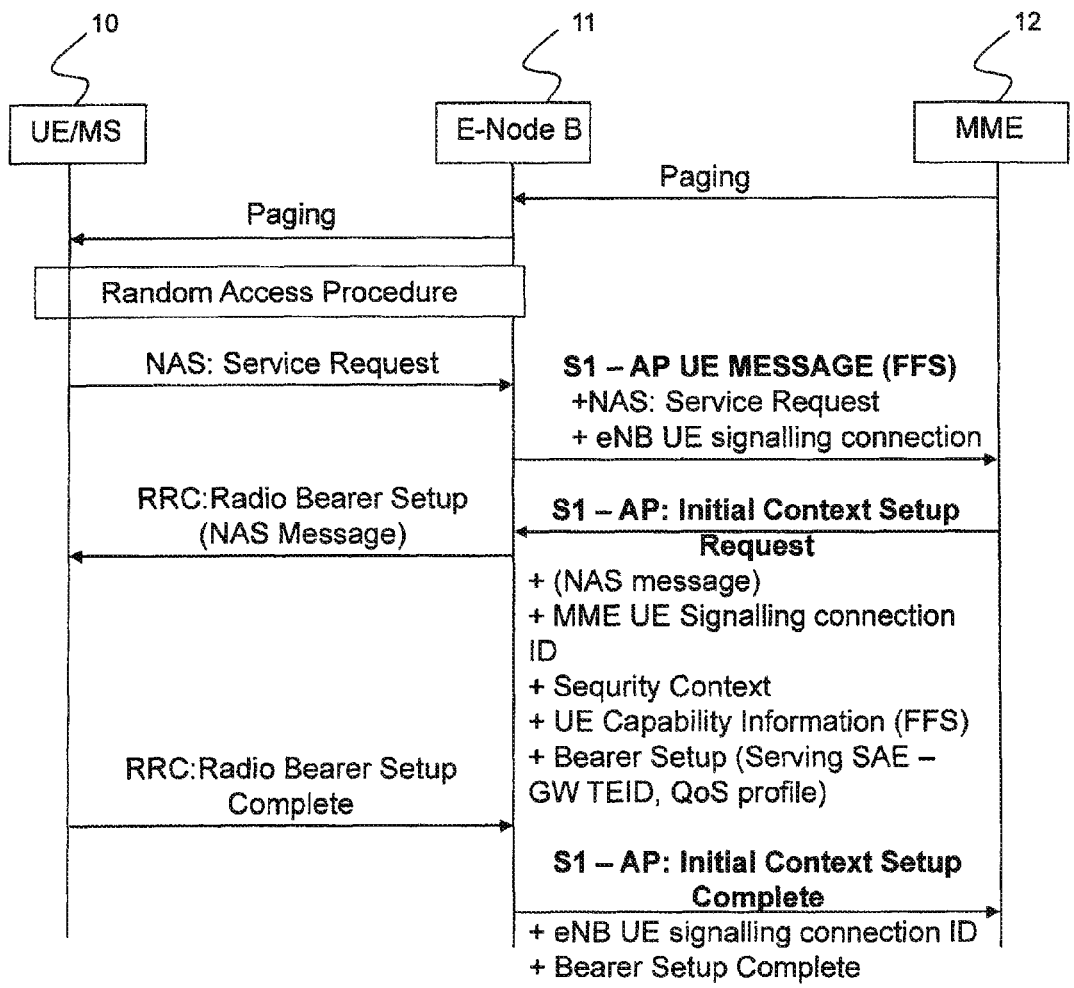
FIG. 2 illustrates a RAN bearer setup according to 3GPP 36.300.
Figure 3:
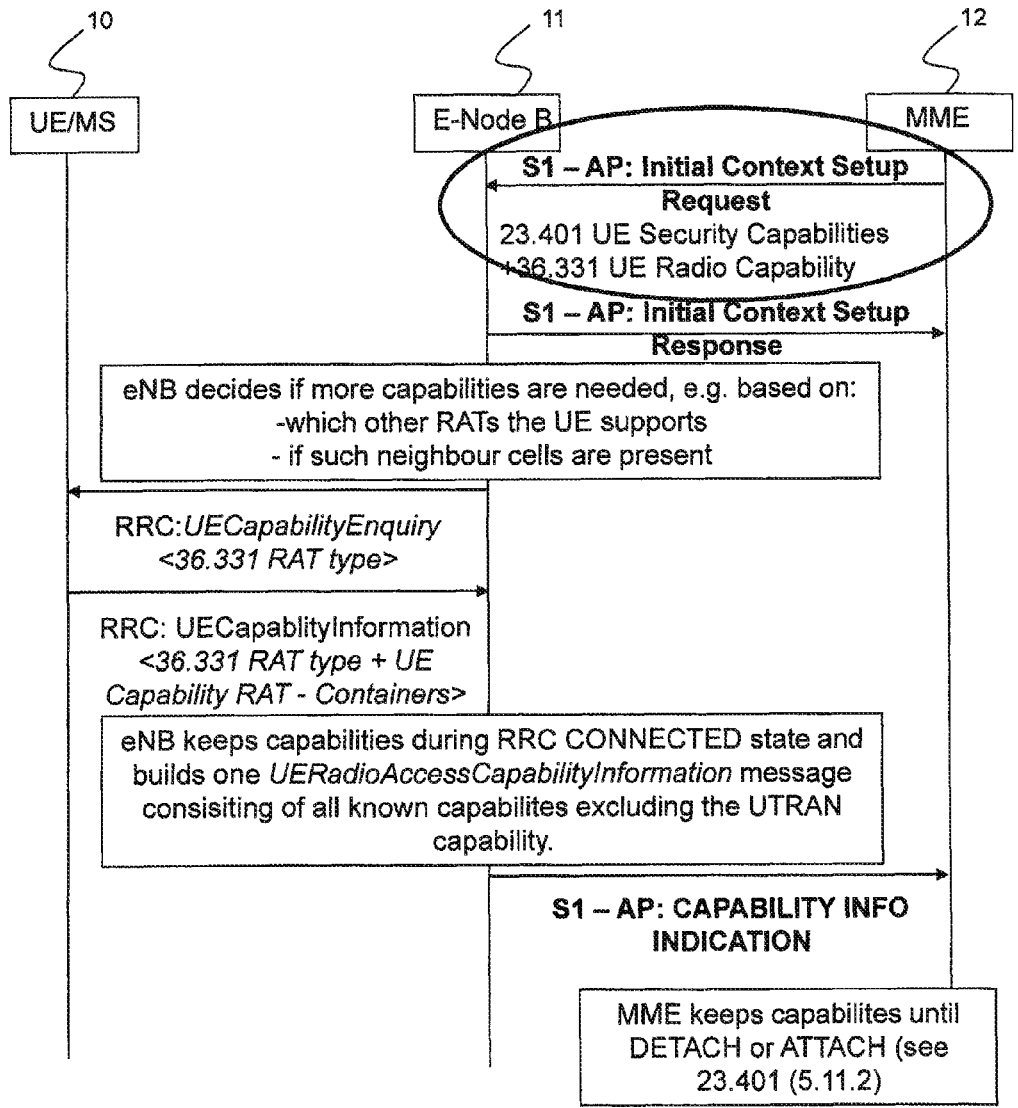
FIG. 3 also illustrates a RAN bearer setup according to 3GPP 36.300.

FIGS. 2 and 3 illustrates UE context setup according to 3GPP 36.300. The details of these figures can be found in the specification. In the figures, the Initial Context Setup request is shown, which is initiated by the initial UE message sent to the MME. At service requests/S1-AP initial context setup, see FIGS. 2-3, the "User profile value" derived from the measurement of the user behaviour is sent to the eNodeB in order to help set the appropriate inactivity timer. The information is used to set the initial value of the timer and after a number of handovers the value can be lowered by the eNodeB. The MME 11 sent the timer setup information in each setup request to the eNodeB sending the initial UE message.

The "User profile value" is determined so that the eNodeB 11 is informed to increases the time period of the inactivity timer when the number of handovers for the UE 10 is reduced or the number of service requests from the UE is increased. Further, the eNodeB 11 is informed to reduce the time period of the inactivity timer when the number of handovers for the UE is increased or the number of service requests from the UE is reduced.

It will be appreciated by a person skilled in the art that the invention is not to be regarded as being limited to the embodiments described above, a number of additional variants and modifications being possible within the scope of the subsequent patent claims.

The invention claimed is:

1. A method for user equipment (UE) context setup in an eNodeB for a UE subscriber in an infrastructure network, the network comprising at least one eNodeB providing radio access for the UE and a mobility management entity (MME) connected to the eNodeB, the eNodeB comprising an inactivity timer releasing the UE context being setup in the eNodeB after a defined time period, comprising:

receiving at the eNodeB a setup request transmitted from the UE, wherein the eNodeB, in response to said setup request, sends an initial UE message to the MME to initiate the UE context setup, the initial UE message identifying the UE sending the setup request, and the MME is configured such that, in response to said initial UE message, the MME sends an initial UE context setup request to the eNodeB;

receiving at the eNodeB the initial UE context setup request; and responding, by the eNodeB, to the MME with an initial context response complete, wherein the initial UE context setup request includes timer setup information for said UE, and the eNodeB uses the timer setup information to define said time period;

wherein the timer setup information is defined by the MME on the basis of IMEISV International Mobile Equipment Identity Software Version (IMEISV) or International Mobile Subscriber Identity (IMSI);

wherein the eNodeB increase the time period of the inactivity timer when the number of handovers for the UE are reduced or the number of service requests from the UE are increased; and wherein the eNodeB reduces said time period of the inactivity timer when the number of handovers for the UE are increased or the number of service requests from the UE are reduced.

2. The method according to claim 1, wherein the timer setup information comprises a value indicating the time period to be set by the eNodeB.

3. The method according to claim 1, wherein the timer setup information is defined by the MME on the basis of the behaviour of the UE subscribed before the present UE context setup.

4. The method according to claim 3, wherein the behaviour relates to information about the number of handovers or Tracking Area Update for the UE subscriber during a certain time period.

5. The method according to claim 3, wherein the behaviour relates to information about the number of service requests and/or pagings for the UE subscribed during a certain time period.

6. The method according to claim 3, wherein the MME defines the timer setup information during a number of UE context setups or only during one earlier setup.

7. The method according to claim 1, wherein the MME sends the timer setup information in each setup request to the eNodeB sending the initial UE message.

8. A mobility management entity (MME) adapted for user equipment (UE) context setup in an eNodeB, the MME being adapted to:

receive an initial UE message from the eNodeB, the message being sent to initiate a UE context setup, the UE message identifying a UE sending a setup request, send an initial UE context setup request to the eNodeB in response to said initial UE message, wherein initial UE context setup request includes timer setup information for said eNodeB to use to define an inactivity timer time period;

wherein the timer setup information is defined by the MME on the basis of IMEISV International Mobile Equipment Identity Software Version (IMEISV) or International Mobile Subscriber Identity (IMSI);

wherein the eNodeB increase the time period of the inactivity timer when the number of handovers for the UE are reduced or the number of service requests from the UE are increased; and wherein the eNodeB reduces said time period of the inactivity timer when the number of handovers for the UE are increased or the number of service requests from the UE are reduced.

9. The MME according to claim 8, wherein the MME is adapted to define the timer setup information on the basis of the behaviour of the UE subscribed before the present UE context setup.

10. The MME according to claim 8, wherein the MME is adapted to define the timer setup information during a number of UE context setups or only during one earlier setup.

11. The MME according to claim 8, wherein the MME is adapted to send the timer setup information in each setup request to the eNodeB sending the initial UE message.

12. The MME according to claim 8, wherein the MME is adapted to define the timer setup information on the basis of International Mobile Equipment Identity Software Version (IMEISV) or International Mobile Subscriber Identity (IMSI).

13. An eNodeB adapted for user equipment (UE) context setup, the eNodeB comprising an inactivity timer releasing a UE context being setup in the eNodeB after a defined time period, the eNodeB being adapted to:

receive a setup request from a UE;

send an initial UE message to a mobility management entity (MME) in response to said request to initiate a UE context setup, the initial UE message identifying the UE, wherein the MME is configured to respond to the initial UE message by sending to the eNodeB an initial UE context setup request that includes timer setup information for said UE, wherein the eNodeB is configured such that the eNodeB does not forward the initial UE context setup request to the UE;

receive the initial UE context setup request from the MME;

send to the MME an initial context response complete in response to receiving the initial UE context setup request from the MEE;

configure, on the basis of the timer setup information for said UE included in the initial UE context setup request received from the MME, the time period of the inactivity timer for the UE context being setup;

wherein the timer setup information is defined by the MME on the basis of IMEISV International Mobile Equipment Identity Software Version (IMEISV) or International Mobile Subscriber Identity (IMSI);

wherein the eNodeB is adapted to increase the time period of the inactivity timer when the number of handovers for the UE are reduced or the number of service requests from the UE are increased; and wherein the eNodeB is adapted to reduce the time period of the inactivity timer when the number of handovers for the UE are increased or the number of service requests from the UE are reduced.

* * * * *

UNITED STATES PATENT AND TRADEMARK OFFICE
CERTIFICATE OF CORRECTION

PATENT NO. : 8,428,589 B2
APPLICATION NO. : 13/169315
DATED : April 23, 2013
INVENTOR(S) : Hjelmgren et al.

Page 1 of 1

It is certified that error appears in the above-identified patent and that said Letters Patent is hereby corrected as shown below:

On the Title Page, in Item (56), under "OTHER PUBLICATIONS", in Column 2, Line 3, delete "V10.3,0," and insert -- V10.3.0, --, therefor.

In the Specifications

In Column 4, Line 56, delete "MME 11" and insert -- MME 12 --, therefor.

In the Claims

In Column 5, Line 28, in Claim 1, delete "of IMEISV" and insert -- of --, therefor.

In Column 6, Line 6, in Claim 8, delete "of IMEISV" and insert -- of --, therefor.

In Column 6, Line 49, in Claim 13, delete "MEE;" and insert -- MME; --, therefor.

In Column 6, Line 55, in Claim 13, delete "of IMEISV" and insert -- of --, therefor.

Signed and Sealed this
Thirteenth Day of August, 2013

Teresa Stanek Rea
*Acting Director of the United States Patent and Trademark Office*